May 9, 1961 A. W. GERLIKOVSKI 2,983,294
METHOD OF SALVAGING SALVABLE BOWLING PINS
Filed Dec. 9, 1957 5 Sheets-Sheet 1

INVENTOR.
ALDEN W. GERLIKOVSKI
BY
ATTORNEY

May 9, 1961 A. W. GERLIKOVSKI 2,983,294
METHOD OF SALVAGING SALVABLE BOWLING PINS
Filed Dec. 9, 1957 5 Sheets-Sheet 2

INVENTOR.
ALDEN W. GERLIKOVSKI
BY
ATTORNEY

May 9, 1961     A. W. GERLIKOVSKI     2,983,294
METHOD OF SALVAGING SALVABLE BOWLING PINS
Filed Dec. 9, 1957     5 Sheets-Sheet 3

INVENTOR.
ALDEN W. GERLIKOVSKI
BY
ATTORNEY

May 9, 1961  A. W. GERLIKOVSKI  2,983,294
METHOD OF SALVAGING SALVABLE BOWLING PINS
Filed Dec. 9, 1957  5 Sheets-Sheet 5

INVENTOR.
ALDEN W. GERLIKOVSKI
BY
ATTORNEY

United States Patent Office 2,983,294
Patented May 9, 1961

2,983,294
METHOD OF SALVAGING SALVABLE BOWLING PINS
Alden W. Gerlikovski, 831 N. Irwin Ave., Green Bay, Wis.
Filed Dec. 9, 1957, Ser. No. 701,568
1 Claim. (Cl. 144—310)

This invention relates generally to the art of salvaging and reconstructing salvable bowling pins and more particularly to a new and novel method requiring the application of side slabs to a bowling pin during the reconstructing process.

A salvable bowling pin is a used or damaged bowling pin, or the like, whose surface portion has become dented, cracked, chipped, splintered, or otherwise damaged; or a defective new bowling pin or cull that is rejectable because of the presence therein of knots, cracks, cavities, bad surfaces, or is otherwise imperfectly formed, or the like.

It is known to be old in the art of expanding salvable bowling pins, to laterally increase the bulk of salvable bowling pins by the segmental division thereof, and the insertion of slabs therebetween.

The purpose of this invention is to economize on the use of wood by the application of slabs to outside portions of a salvable bowling pin.

An object of this invention is the provision of a new and novel method of reconstructing a salvable bowling pin whereby a bowling pin is fully laterally expanded with the use of a minimum of additional insertable wood.

Another object is to provide a new and novel method of reconstructing a salvable bowling pin whereby diametrically opposite slabs on the outside portions of a salvable bowling pin substitute for an insertable inner slab.

Still another object of this invention is the provision of a new and novel method of reconstructing a salvable bowling pin whereby a slab insert on the inside of a salvable bowling pin expands it laterally along a transverse axis, and shorter slabs, at right angle to said slab insert, on the outside portions of the bowling pin, complete the expansion of the bowling pin in a direction at right angle to said axis.

Yet another object is to provide a method of reconstructing salvable bowling pins quickly and cheaply.

A further object of this invention is the provision of a new and novel method of reconstructing a salvable bowling pin whereby an insertable slab, of a width dimension less than the maximum diameter of the body of the bowling pin, is used to expand the pin laterally along a transverse axis.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 2:
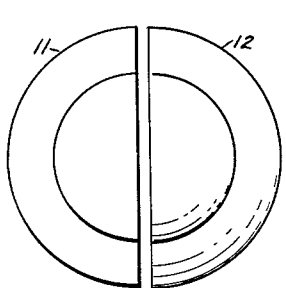
Fig. 2 is a plan view of Fig. 1.
Figure 4:
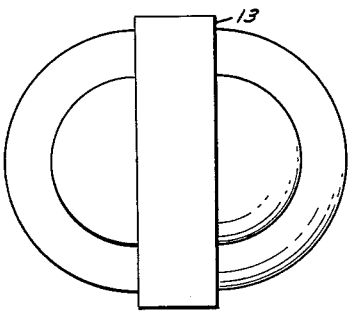
Fig. 4 is a plan view of Fig. 3.
Figure 1:
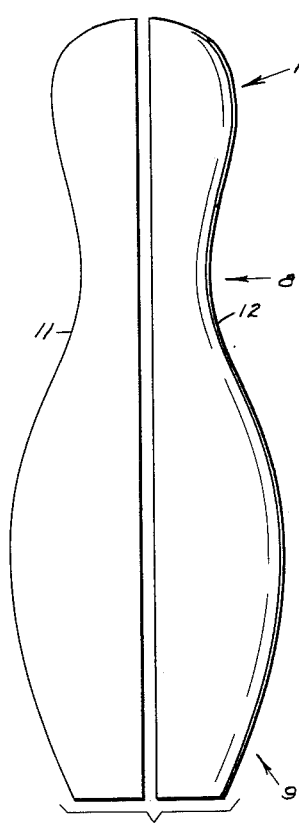
Fig. 1 is an elevation view of a salvabale bowling pin, showing the pin bisected along the longitudinal axis thereof, the symmetric half segments being disposed in spaced relation.

Referring now to the drawings, wherein like reference characters designate like or corresponding parts throughout the several views, there is shown a salvable bowling pin generally indicated at 8, having a body portion generally indicated at 9, and a head portion generally indicated at 10, longitudinally divided along its longitudinal axis by a planar saw cut into two symmetric half segments 11 and 12, see Figs. 1 and 2.

It is preferred, though not necessary, that the dividing out be made at right angle to the flat grain of the salvable bowling pin, thereby providing a maximum of edge grain in the finished reconstructed pin, due to the wood slab insert to be hereinafter described.

The two planar cut faces of the segments are then made smooth, if necessary, by any suitable means, such as sanding, planing, or the like.

Figure 3:
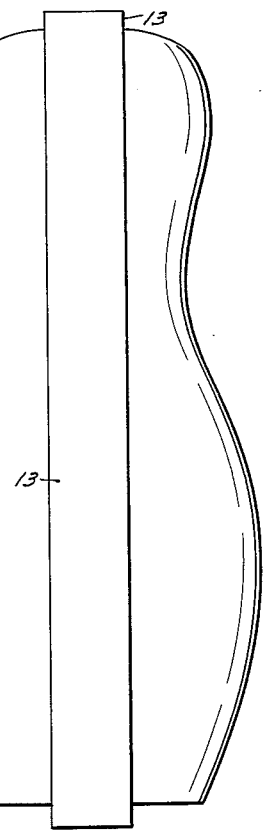
Fig. 3 is an elevation view, showing the half segments of Fig. 1 oppositely disposed and cemented on opposite faces of an intervening wood slab, forming a partially laterally expanded rough pin unit.

After the cut faces have been properly smoothed, said faces are coated with a glue or cement, and oppositely disposed on opposite faces of an intervening rectangular wood slab 13, symmetrical about the longitudinal axis of said slab 13, and the segments held pressed to said slab until the cement has dried, thereby forming a partially expanded rough pin unit, as shown in Fig. 3. The wood slab should preferably be of the same wood as the salvable bowling pin, adequately dried for the intended purpose, should be of length and width at least as great as the corresponding dimensions of the salvable bowling pin, and of a thickness to allow for the ultimate removal of the pertinent defects in the segments of said rough pin unit during its processing to a finally reconstructed pin. A seven-eighths inch (⅞") thickness suffices in most instances, though not limited thereto. Said partially expanded rough pin unit has a body portion and a head portion corresponding to the original salvable bowling pin.

Should the salvable pin be overweight, the slab can be of a density less than the density of the overweight pin, to bring the weight of the ultimately reconstructed pin within specification limits for a new standard pin.

Figure 6:
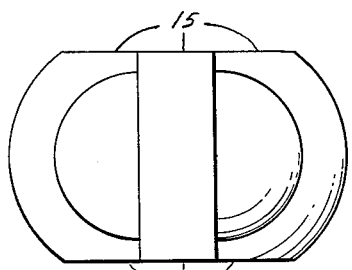
Fig. 6 is a plan view of Fig. 5.
Figure 5:
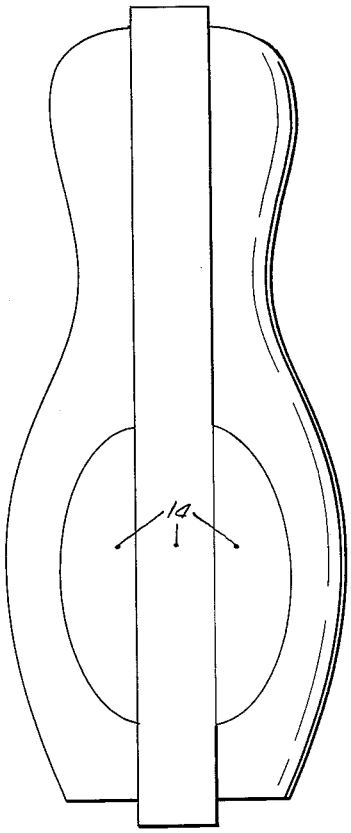
Fig. 5 is an elevation view, showing the rough pin unit of Fig. 3 planed at right angle to the plane of the inserted slab, whereby to provide oppositely disposed flat surface portions on the body of the pin only.

The partially expanded rough pin unit is then planed at right angle to the plane of the intervening wood slab insert, and parallel to the longitudinal axis of said wood slab insert, and a section thereof removed to a depth to include a substantial portion of the body of the salvable bowling pin segments, such as indicated at 14, see Figs. 5 and 6. Such removal and planing is also done on the opposite side of the rough pin unit to provide a similar oppositely disposed continuous planar face, such as indicated at 15, see Fig. 6.

Figure 7:
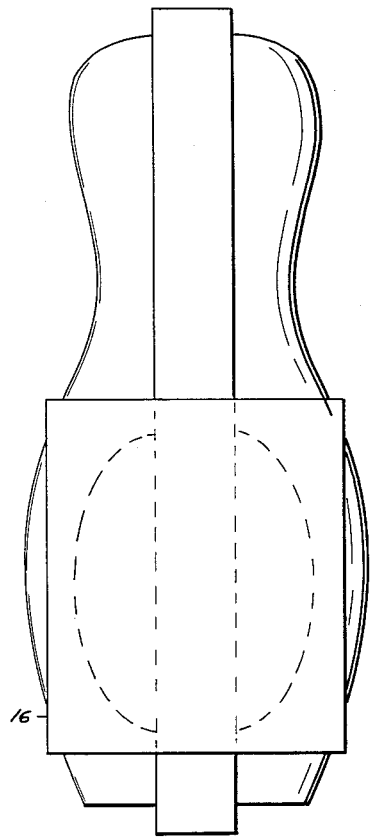
Fig. 7 is an elevation view showing short wood slabs secured to the oppositely disposed flat surface portions on the body of the pin, forming a fully laterally expanded rough pin structure.

Said cut planar faces 14 and 15 are then coated with glue or cement, and similar rectangular wood slabs 16 and 17 are superposed over said faces and held pressed to said faces, respectively, until the glue or cement has dried, thereby securing the slabs to said faces, and forming a fully expanded rough pin structure, such as shown in Fig. 7.

Said slabs 16 and 17 are of dimensions to substantially cover the flat faces, and are roughly five inches (5") wide, seven inches (7") high and three-fourths inch (¾") thick, for all practical purposes, though not limited thereto. Specifically the side slabs 16 and 17 should be at least as thick as the planed and removed body portions of said salvable pin segments, respectively. These wood slabs should also preferably be of the same wood as the salvable bowling pin, adequately dried for the intended purpose.

The over-all bulk and circumference of the fully expanded rough pin structure is obviously greater than a standard size pin, so that when said rough structure is trimmed to proper size, the excess and damaged portions will be removed, and a sound standard pin result.

The fully expanded rough pin structure is now ready for trimming. In trimming, those portions of the wood slabs projecting beyond the rough pin outline can be removed first, preferably with a band saw.

Figure 9:
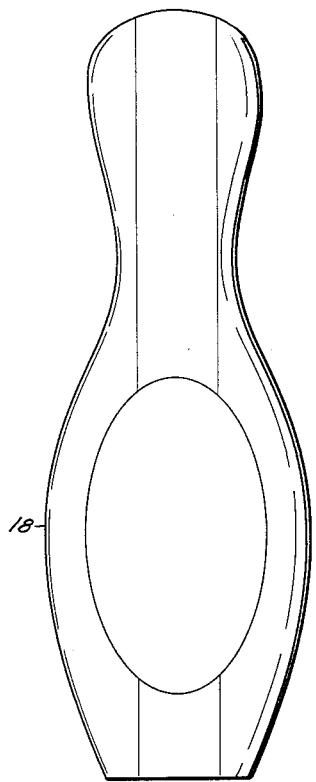
Fig. 9 is an elevation view showing a finished reconstructed pin, after the removal of excess outer portions of the fully laterally expanded rough pin structure shown in Fig. 7.

The resulting rough bowling pin body is then mounted in a lathe with the spindle points substantially on the longitudinal axis of said wood body, and trimmed down gradually, with the use of suitable cutting tools, to a size, shape, and specification of a standard bowling pin, such as indicated at 18 of Fig. 9.

The modified method manifested in Figs. 11–14, embodies the initial steps disclosed in Figs. 1–2, the intervening steps disclosed in Figs. 11–14, and the final steps disclosed in Figs. 7–10.

Figure 12:
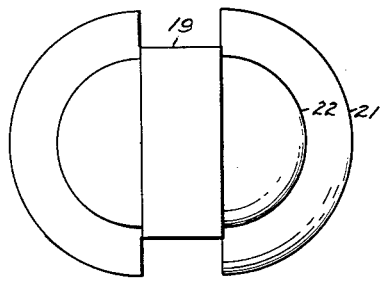
Fig. 12 is a plan view of Fig. 11.
Figure 14:
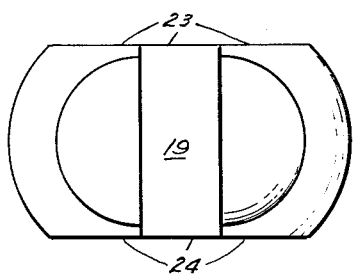
Fig. 14 is a plan view of Fig. 13.
Figure 11:
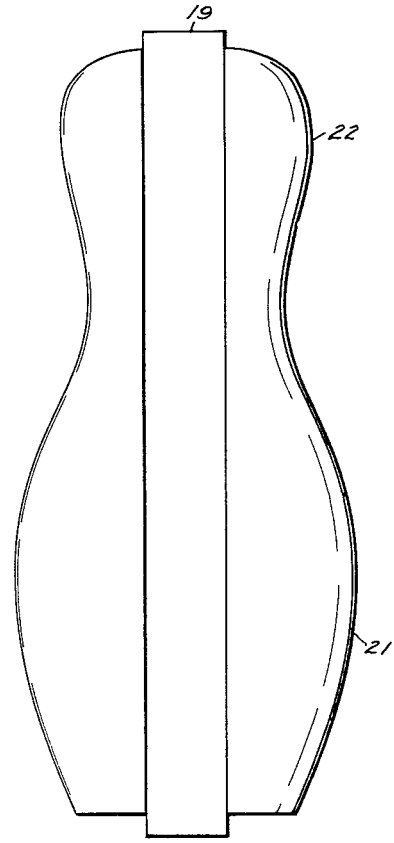
Fig. 11 is a modification, showing an elevation view of a longitudinally bisected pin having interposed and cemented therebetween a relatively narrow slab of a width dimension less than the maximum diameter of the body of a bowling pin, yet greater than the maximum diameter of the head of a bowling pin.
Figure 13:
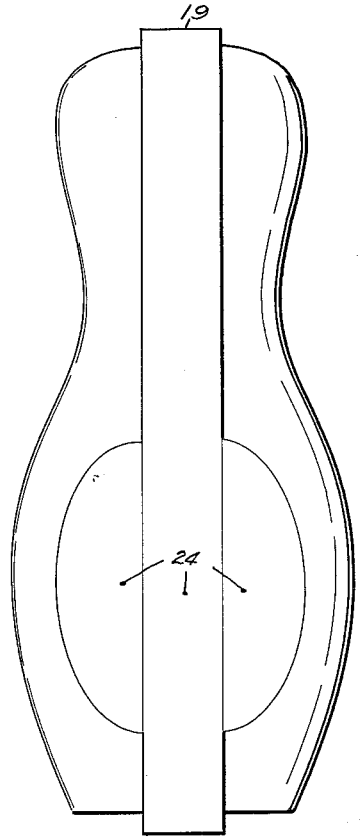
Fig. 13 is an elevation view showing the rough pin unit of Fig. 11 planed to the plane of the edges of the narrow slab insert, thereby providing oppositely disposed continuous plane surface portions.

In this modified method the divided salvable pin disclosed in Figs. 1–2, has its planar cut faces properly smoothed and coated with cement, and oppositely disposed on opposite faces of a narrow intervening rectangular wood slab insert 19, and disposed symmetrically about the longitudinal axis of the slab, and the segments held pressed to the slab until the cement has dried and the pieces secured, thereby forming a partially expanded rough pin unit, as shown in Figs. 11–12. The wood slab should preferably be of the same wood as the salvable bowling pin, adequately dried for the intended purpose, and should be of a length at least as great as the corresponding dimension of the salvable pin. The thickness of the slab should be sufficient to allow for the ultimate removal of the pertinent defects in the segments during processing to a finally reconstructed pin. A seven-eighths inch (⅞") thickness suffices in most instances, though not limited thereto.

Normally the width of the slab, in this modification, should be less than the maximum diameter of the body portion 21 of the original salvable pin, yet at least as wide as the maximum diameter of the head portion 22 of the original salvable bowling pin, see Fig. 12.

And normally the pin body portions of the partially expanded rough pin unit are then planed off parallel to, and to a depth of, the planes of the flat edges of the narrow slab insert 19, or therebeyond, but not into the head portions of the original salvable bowling pin, thereby providing oppositely disposed continuous plane surface portions 23 and 24.

However, in the event the pin is being prepared for plastic coating, or the like, then the above widths can be reduced accordingly to account for the thickness of such coating, and the planing depth conducted accordingly, even into the head portion if need be.

Figure 8:
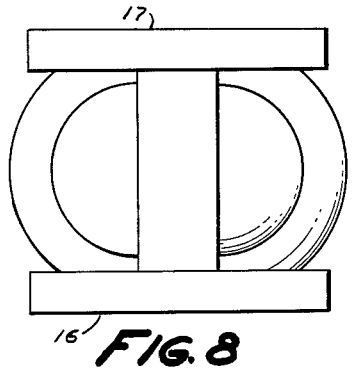
Fig. 8 is a plan view of Fig. 7.

Said flat faces 23 and 24 are then coated with cement, and relatively short similar rectangular wood slabs, such as indicated at 16 and 17 in Figs. 7 and 8, are superposed over said plane faces 23 and 24, respectively, and held pressed to said faces until the cement has dried, thereby securing said short slabs to said faces, and forming a fully expanded rough pin structure, such as shown in Figs. 7 and 8.

The over-all bulk and circumference of said fully expanded rough pin structure is greater than a standard size pin, so that when said rough structure is trimmed to proper size, the excess and damaged portions will have been removed, and a sound standard pin result.

Said fully expanded rough pin structure is now ready for trimming. In trimming, those portions of the wood slabs projecting beyond the rough pin outline can be removed first, preferably with a band saw, if desired.

Figure 10:
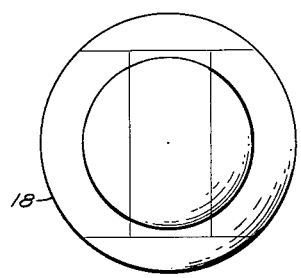
Fig. 10 is a plan view of Fig. 9.

The resulting rough bowling pin body is then mounted in a lathe with the spindle points substantially on the longitudinal axis of said wood body, and trimmed down gradually, with the use of suitable cutting tools, to a size, shape and specification of a standard bowling pin, such as indicated at 18 of Figs. 9 and 10. It is understood that standard size includes a pin of slightly reduced size, relative to a standard pin, to allow for a plastic coating thereon, or the like, should such coating be desired on a pin.

Figure 16:
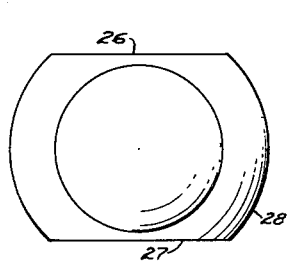
Fig. 16 is a plan view of Fig. 15.
Figure 15:
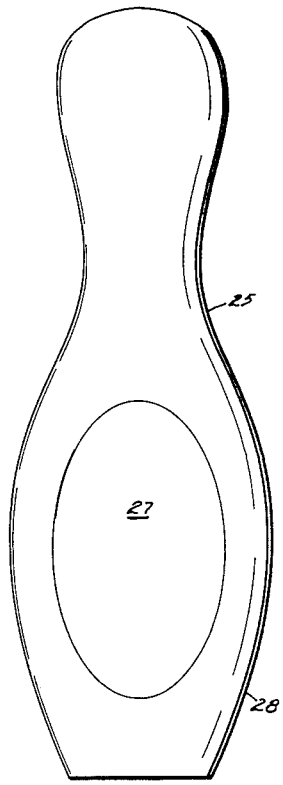
Fig. 15 is a second modification, showing an elevation view of a salvable bowling pin, showing the pin body planed on opposite sides thereof to provide oppositely disposed flat surface portions on the body of said salvable pin.

In the modified method disclosed by Figs. 15–24, a salvable bowling pin 25 is first planed on opposite sides thereof to provide oppositely disposed flat surface portions 26 and 27 on the body portion 28 of said salvable pin, as shown in Figs. 15 and 16.

Figure 18:
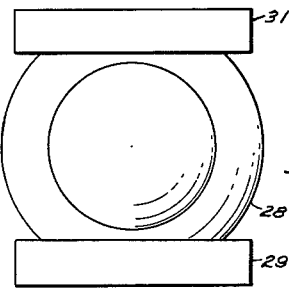
Fig. 18 is a plan view of Fig. 17.
Figure 17:
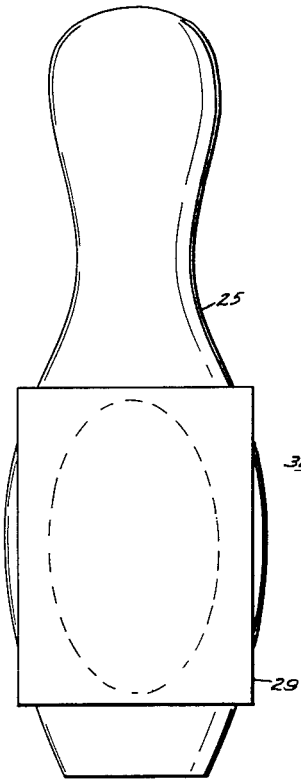
Fig. 17 is an elevation view showing short wood slabs secured to the opposite flat faces of the planed pin shown in Fig. 15 thereby forming a partially laterally expanded rough pin unit.

Said flat faces 26 and 27 are then coated with cement, and relatively short similar rectangular wood slabs, such as indicated at 29 and 31 in Figs. 17 and 18, are superposed over said plane faces 26 and 27, respectively, and held pressed to said faces until the cement has dried, thereby securing said short slabs to said faces, and forming a partially laterally expanded rough pin unit, such as shown in Figs. 17 and 18.

Figure 20:
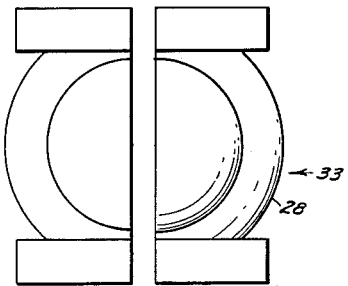
Fig. 20 is a plan view of Fig. 19.
Figure 19:
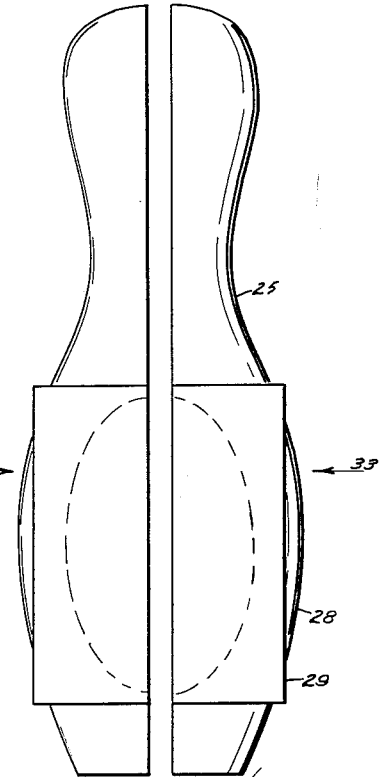
Fig. 19 is an elevation view of the partially laterally expanded rough pin unit bisected along the longitudinal axis thereof and on a plane at right angle to the short wood slabs, the symmetric half segments being disposed in spaced relation.

Said partially expanded rough pin unit is bisected along its longitudinal axis and on a plane at right angle to the plane of said short wood slabs, into two symmetric half segments generally indicated as 32 and 33, as shown by Figs. 19 and 20.

The two planar bisecting faces of the segments are then made smooth, if necessary, by any means such as sanding, planing, or the like.

Figure 22:
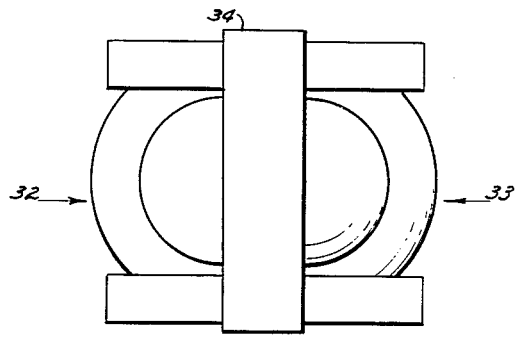
Fig. 22 is a plan view of Fig. 21.
Figure 21:
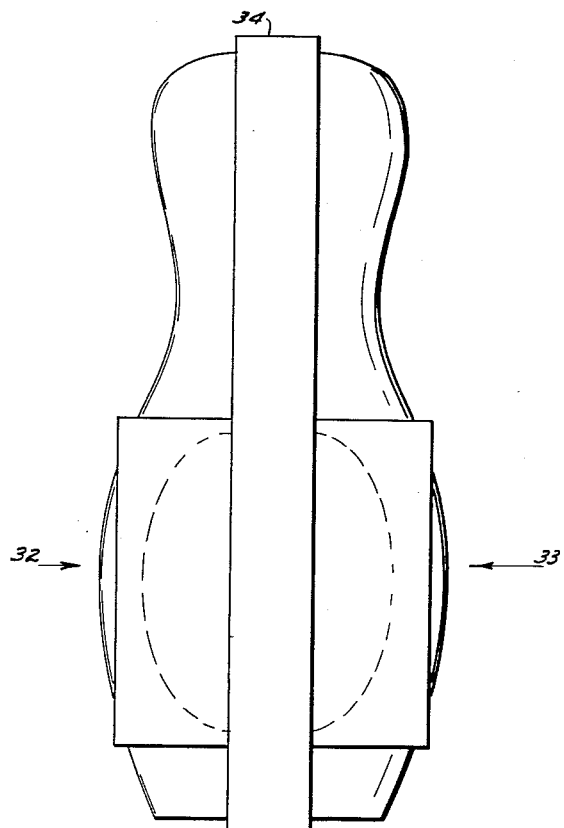
Fig. 21 is an elevation view of the half segments of Fig. 19 oppositely disposed and mounted on opposite faces of an intervening wood slab, forming a fully laterally expanded rough pin structure.

After said cut faces are properly smoothed, said faces are coated with cement, and oppositely disposed on opposite faces of an intervening rectangular wood slab 34, symmetrical about the longitudinal axis of said slab 34, and the segments held pressed to said slab until the cement has dried, thereby forming a fully expanded rough pin structure, as shown in Figs. 21 and 22.

Said wood slabs should preferably be of the same wood as the salvable bowling pin, and adequately dried for the intended purpose. Should the salvable pin be overweight, the slabs can be of a density less than the density of the overweight pin, to bring the weight of the ultimately reconstructed pin within specification limits for a new standard pin.

The wood slab insert 34 should be of a length and width at least as great as the corresponding dimensions of the salvable bowling pin, and of a thickness to allow for the ultimate removal of the pertinent defects in the segments of said rough pin unit during its processing to a finally reconstructed pin. A seven-eighths inch (⅞") thickness suffices in most instances, though not limited thereto.

The short wood slabs 29 and 31 are of a dimension to substantially cover the provided flat faces 27 and 26, respectively, and are roughly five inches (5") wide, seven inches (7") high, and three-fourths inch (¾") thick for all practical purposes, though not limited thereto. Specifically the side slabs 29 and 31 should be at least as thick as the planed and removed body portions of said salvable pin segments, respectfully.

The over-all bulk and circumference of the fully expanded rough pin structure is obviously greater than a standard size pin, so that when said rough structure is trimmed to proper size, the excess and damaged portions will be removed, and a sound standard pin result.

The fully expanded rough pin structure is now ready for trimming. In trimming, those portions of the wood slabs projecting beyond the rough pin outline can be removed first, preferably with a band saw, if desired.

Figure 24:
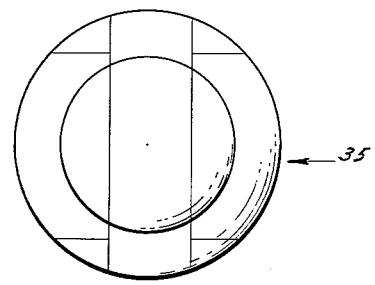
Fig. 24 is a plan view of Fig. 23.
Figure 23:
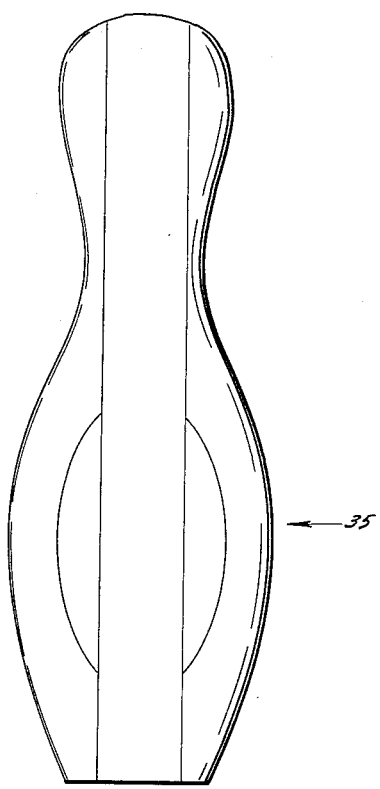
Fig. 23 is an elevation view showing the fully expanded rough pin structure of Fig. 21, after the removal of excess outer portions and finished to a size, shape and specification of a standard bowling pin.

The rough pin structure is then mounted in a lathe with the spindle points substantially on the longitudinal axis of said rough wood body, and trimmed down gradually, with the use of suitable cutting tools, to a size, shape, and specification of a standard bowling pin, such as generally indicated at 35 in Figs. 23 and 24.

It is understood that standard size includes a pin of a slightly reduced size, relative to a standard pin, to allow for a plastic coating thereon, or the like, should such coating be desired on a pin.

One feature of this second modification is the provision of a new and novel method of reconstructing a salvable bowling pin wherein a salvable bowling pin is laterally expanded in the first place by the application of wood slabs on oppositely disposed flat surfaces planed on the body portion, only, of the bowling pin.

The features of this invention are the provision of a new and novel method of reconstructing a salvable bowling pin, whereby a partially laterally expanded salvable bowling pin is fully and completely expanded by the application of wood slabs on oppositely disposed flat surfaces planed on the outside body portion of said bowling pin; a method whereby a salvable bowling pin is partially laterally expanded in the first place by the use of a relatively narrow slab insert of a width dimension less than the maximum diameter of the body of a bowling pin, yet greater than the maximum diameter of the head of a bowling pin; a method whereby a salvable bowling pin is partially laterally expanded by the use of a slab insert substantially as wide as the maximum diameter dimension of the head of the bowling pin; and a method wherein a salvable bowling pin is laterally expanded in the first place by the application of wood slabs on oppositely disposed flat surfaces planed on the body portion, only, of the bowling pin.

Obviously, many modifications and variations of the present invention are possible in the light of the above teachings. It is therefore to be understood, that within the scope of the appended claim, the invention may be practised otherwise than as specifically described.

What is claimed and desired to be protected by Letters Patent of the United States is:

The method of repairing a used salvable bowling pin, comprising the steps of: dividing a salvable bowling pin, having a body portion and a head portion, longitudinally into substantially half segments; cementing said segments, substantially oppositely disposed, on opposite faces of slab insert means and substantially symmetrically about the longitudinal axis of said slab insert means, to form a partially expanded rough pin unit having a body portion and a head portion; removing sections of the body portion of said partially expanded rough pin unit on opposite sides thereof to a predetermined depth to respective plane faces substantially at right angle to said dividing plane and substantially parallel to the longitudinal axis of said slab insert means, said removed sections including body portions of said salvable pin segments and body portions of said slab insert means; cementing second slab means on said plane faces of the partially expanded rough pin unit, respectively, said second slab means being substantially as thick as the removed body portions of said salvable pin segments, respectively, to form a fully expanded rough pin structure; and trimming away excess outer portions of said fully expanded rough pin structure to form a reconstructed bowling pin of standard size and shape.

References Cited in the file of this patent
UNITED STATES PATENTS

| | | |
|---|---|---|
| 1,214,126 | Boldt | Jan. 30, 1917 |
| 1,567,390 | Ruppert | Dec. 29, 1925 |
| 2,483,568 | Waite | Oct. 4, 1949 |
| 2,634,774 | Francar | Apr. 14, 1953 |
| 2,823,714 | Francar | Feb. 18, 1958 |